United States Patent
Chard et al.

(10) Patent No.: US 8,326,364 B2
(45) Date of Patent: Dec. 4, 2012

(54) HIGH RESOLUTION, LOW POWER DESIGN FOR CPRI/OBSAI LATENCY MEASUREMENT

(75) Inventors: Gary F. Chard, Garland, TX (US); T-Pinn R. Koh, Allen, TX (US); Yilun Wang, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 429 days.

(21) Appl. No.: 12/779,373

(22) Filed: May 13, 2010

(65) Prior Publication Data

US 2011/0281593 A1 Nov. 17, 2011

(51) Int. Cl.
  *H04B 1/38* (2006.01)
(52) U.S. Cl. ............ 455/561; 455/560; 327/37; 327/38; 327/39; 327/41; 327/46; 327/93; 713/501; 713/502; 713/503; 713/601; 713/600
(58) Field of Classification Search .................. 455/560, 455/561; 713/500–503, 600, 601; 327/37–41, 327/46, 93
See application file for complete search history.

(56) References Cited

U.S. PATENT DOCUMENTS

| 6,647,278 | B2* | 11/2003 | Mitten et al. | 455/567 |
| 6,788,655 | B1* | 9/2004 | Underbrink | 370/324 |
| 7,830,906 | B2* | 11/2010 | Satoh et al. | 370/423 |
| 7,913,104 | B1* | 3/2011 | Cory et al. | 713/503 |
| 7,924,054 | B1* | 4/2011 | Doubler et al. | 326/41 |
| 7,934,113 | B2* | 4/2011 | Chard et al. | 713/500 |
| 8,099,620 | B2* | 1/2012 | Choi et al. | 713/500 |
| 2006/0227916 | A1* | 10/2006 | Masui et al. | 375/355 |

FOREIGN PATENT DOCUMENTS

EP 1814341 8/2007

* cited by examiner

*Primary Examiner* — Olumide T Ajibade Akonai
(74) *Attorney, Agent, or Firm* — John J. Patti; Wade J. Brady, III; Frederick J. Telecky, Jr.

(57) ABSTRACT

As part of the protocol for Common Public Radio Interface/Open Base Station Architecture Initiative (CPRI/OBSAI) systems, timing circuits are used to calculate the "round trip" latency across CPRI/OBSAI links. Traditionally, these timing circuits have been plagued with numerous problems. Here, however, a timing circuit is provided that has improved latency measurement accuracy, reduced power consumption, and a reduced likelihood of detecting a false comma. This is generally accomplished through the use of double edge latching in combination with post processing circuit and single bit transmission between low and high speed clock domains.

19 Claims, 5 Drawing Sheets

HIGH RESOLUTION, LOW POWER DESIGN FOR CPRI/OBSAI LATENCY MEASUREMENT

TECHNICAL FIELD

The invention relates generally to Common Public Radio Interface/Open Base Station Architecture Initiative (CPRI/OBSAI) systems and, more particularly, to performing latency measurements for CPRI/OBSAI systems.

BACKGROUND

Referring to FIG. 1 of the drawings, the reference numeral 100 generally designates a portion of a convention communications system. As shown, a base station system 102 operates to provide communications between a network interface 106 and an air interface, which is typically used for wireless communications. The base station system 102 generally comprises radio equipment 108 and a radio equipment controller 110, which each have a physical layer (PHY) 112 and 114 that communicate with each other over a CPRI/OBSAI link 113. As part of the protocol for a CPRI/OBSAI system, PHY 114 generally includes a timing circuit 116 that operates to calculate the "round trip" latency between the radio equipment 108 and radio equipment controller 110.

Turning to FIG. 2, an example of a conventional PHY 114 can be seen in greater detail. Within PHY 114, there is a transmit path 118 and a receive path 120 that serially communicate data to PHY 112 over link 113 and that communicate (in parallel) data to/from the network interface 106. When performing latency calculation, the stop/start counter 126 measures the elapsed time between commas (either encoded or unencoded) detected by the comma detect circuits 122 and 124. Typically, counter 126 measures the time between a comma detected from the parallel transmit data (or transmit comma) by comma detect circuit 122 and a comma detected from the parallel receive data (or receive comma) by comma detect circuit 124. The resolution of this latency measurement is a factor in evaluating the system 100.

As a result, it is desirable to have the latency measurement be as high a resolution as possible. However, for timing circuit 116, there are drawbacks. For example, the logic for the timing circuit 116 operates in a high speed clock domain (compared to the clock domain used for the transmit and receive paths 118 and 120). This high speed configuration results in significant power consumption as well as increased risk of a false comma detection when the parallel data containing a comma is presented to the high speed clock domain from the lower speed clock domains. Therefore, there is a need for a timing circuit with improved performance.

Another example of a conventional is European Patent No. EP1814341.

SUMMARY

A preferred embodiment of the present invention, accordingly, provides an apparatus. The apparatus comprises a transmit comma detect circuit that is clocked by first clock signal; a receive comma detect circuit that is clocked by the first clock signal; and a stopwatch counter having: a transmit latching circuit having: a first transmit latching path that is clocked by negative edges of a second clock signal and that is coupled to the transmit comma detect circuit, wherein the frequency of the second clock signal is greater than the frequency of the first clock signal; a second transmit latching path that is clocked by positive edges of the second clock signal and that is coupled to the transmit comma detect circuit; and a first flip-flop having an input terminal, a clock terminal, and an output terminal, wherein the input terminal of the first flip-flop is coupled to the first transmit latching path, and wherein the clock terminal of the first flip-flop is coupled to the second transmit latching path; a receive latching circuit having: a first receive latching path that is clocked by the negative edges of the second clock signal and that is coupled to the receive comma detect circuit; a second receive latching path that is clocked by the positive edges of the second clock signal and that is coupled to the receive comma detect circuit; and a second flip-flop having an input terminal, a clock terminal, and an output terminal, wherein the input terminal of the first flip-flop is coupled to the first receive latching path, and wherein the clock terminal of the first flip-flop is coupled to the second receive latching path; and a counter state machine that is coupled to the second transmit latching path, the second receive latching path, the first flip-flop, and the second flip-flop.

In accordance with a preferred embodiment of the present invention, the first transmit latching path and the first receive latching path each further comprises: a plurality of input negative edge triggering flip-flops coupled in series with one another; a first logic circuit that is coupled to at least one of the input negative edge triggering flip-flops; and an output negative edge triggering flip-flop that is coupled to the first logic circuit and the first flip flop for the first transmit latching path and the second flip-flop for the first receive latching path.

In accordance with a preferred embodiment of the present invention, the first logic circuit further comprises: a first AND gate that is coupled to at least two of the input negative edge triggering flip-flops; and a second AND gate that is coupled to the first AND gate and the counter state machine.

In accordance with a preferred embodiment of the present invention, the second transmit latching path and the second receive latching path each further comprises: a plurality of input positive edge triggering flip-flops coupled in series with one another; a first logic circuit that is coupled to at least one of the input positive edge triggering flip-flops; and an output positive edge triggering flip-flop that is coupled to the fourth AND gate and the first flip flop for the second transmit latching path and the second flip-flop for the second receive latching path.

In accordance with a preferred embodiment of the present invention, the first logic circuit further comprises: a first AND gate that is coupled to at least two of the input positive edge triggering flip-flops; and a second AND gate that is coupled to the first AND gate and the counter state machine.

In accordance with a preferred embodiment of the present invention, the counter state machine further comprises: a count enable generator that is coupled to the output positive edge triggering flip-flop from each of the second transmit latching path and the second receive latching path; a post processing circuit that is coupled to the count enable generator; a counter that is coupled to the count enable generator; a validation circuit count enable generator; an output circuit that is coupled to the counter and the validation circuit; and a gating circuit that is coupled to the output positive edge triggering flip-flop from each of the second transmit latching path and the second receive latching path and the count enable generator.

In accordance with a preferred embodiment of the present invention, the post processing circuit and counter further comprises: a first OR gate that is coupled to the first flip-flop and the second flip-flop; an XOR gate that is coupled to the first flip-flop and the second flip-flop; an AND gate that is coupled to the first OR gate and the count enable generator; a third flip-flop that is coupled to the AND gate; a second OR gate that is coupled to the count enable generator and the third flip-flop; an incrementer that is coupled to the second OR gate and the count enable generator; a fourth flip-flop that is couple to the XOR gate; and a fifth flip-flop that is coupled to the fourth flip-flop and the count enable generator.

In accordance with a preferred embodiment of the present invention, the transmit comma detect circuit and the receive comma detect circuit each has a plurality of channels, and wherein the first clock signal further comprises a transmit clock signal for clocking the transmit comma detect circuit and a receive clock signal for clocking the receive comma detect circuit, and wherein the apparatus further comprises: a first multiplexer that is coupled between the transmit comma detect circuit and the stopwatch counter; and a second multiplexer that is coupled between the receive detect circuit and the stopwatch circuit.

In accordance with a preferred embodiment of the present invention, an apparatus is provided. The apparatus comprises a physical layer (PHY) transmit path; a PHY receive path; a transmit comma detect circuit that is clocked by first clock signal and that is coupled to the PHY transmit path; a receive comma detect circuit that is clocked by the first clock signal and that is coupled to the PHY receive path; and a stopwatch counter having: a transmit latching circuit having: a first transmit latching path that is clocked by negative edges of a second clock signal and that is coupled to the transmit comma detect circuit, wherein the frequency of the second clock signal is greater than the frequency of the first clock signal; a second transmit latching path that is clocked by positive edges of the second clock signal and that is coupled to the transmit comma detect circuit; and a first flip-flop having an input terminal, a clock terminal, and an output terminal, wherein the input terminal of the first flip-flop is coupled to the first transmit latching path, and wherein the clock terminal of the first flip-flop is coupled to the second transmit latching path; a receive latching circuit having: a first receive latching path that is clocked by the negative edges of the second clock signal and that is coupled to the receive comma detect circuit; a second receive latching path that is clocked by the positive edges of the second clock signal and that is coupled to the receive comma detect circuit; and a second flip-flop having an input terminal, a clock terminal, and an output terminal, wherein the input terminal of the second flip-flop is coupled to the first receive latching path, and wherein the clock terminal of the first flip-flop is coupled to the second receive latching path; and a counter state machine that is coupled to the second transmit latching path, the second receive latching path, the first flip-flop, and the second flip-flop.

In accordance with a preferred embodiment of the present invention, method for measuring latency in a Common Public Radio Interface/Open Base Station Architecture Initiative (CPRI/OBSAI) system is provided. The method comprises performing transmit comma detection so as to generate a transmit comma detection scalar; generating a start signal from the transmit detection scalar based on positive edge triggering of a clock signal; generating a first data signal from the transmit detection scalar based on negative edge triggering of the clock signal; latching the first data signal so as to generate a transmit signal, wherein the start signal is used as a transmit clocking signal for the step of latching the first data signal; performing receive comma detection so as to generate a receive comma detection scalar; generating a stop signal from the receive detection scalar based on positive edge triggering of the clock signal; generating a second data signal from the receive detection scalar based on negative edge triggering of the clock signal; latching the second data signal so as to generate a receive signal, wherein the stop signal is used as a receive clocking signal for the step of latching the second data signal; and calculating the latency based at least in part on receive signal, transmit signal, stop signal, and start signal.

In accordance with a preferred embodiment of the present invention, the method step of calculating further comprises: counting between assertion of the start signal and assertion of the stop signal; and performing a correction calculation after assertion of the stop signal.

In accordance with a preferred embodiment of the present invention, the step of performing a correction calculation further comprises: XORing the transmit and receive signals; latching the XORed the transmit and receive signals to generate a first latched signal; ORing the transmit signal and an inverse of the receive signal; latching the ORed transmit signal and inverse of the receive signal to generate a second latched signal; ORing with second latched signal and an enable signal to generate an increment signal; and incrementing based at least in part on the increment signal.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
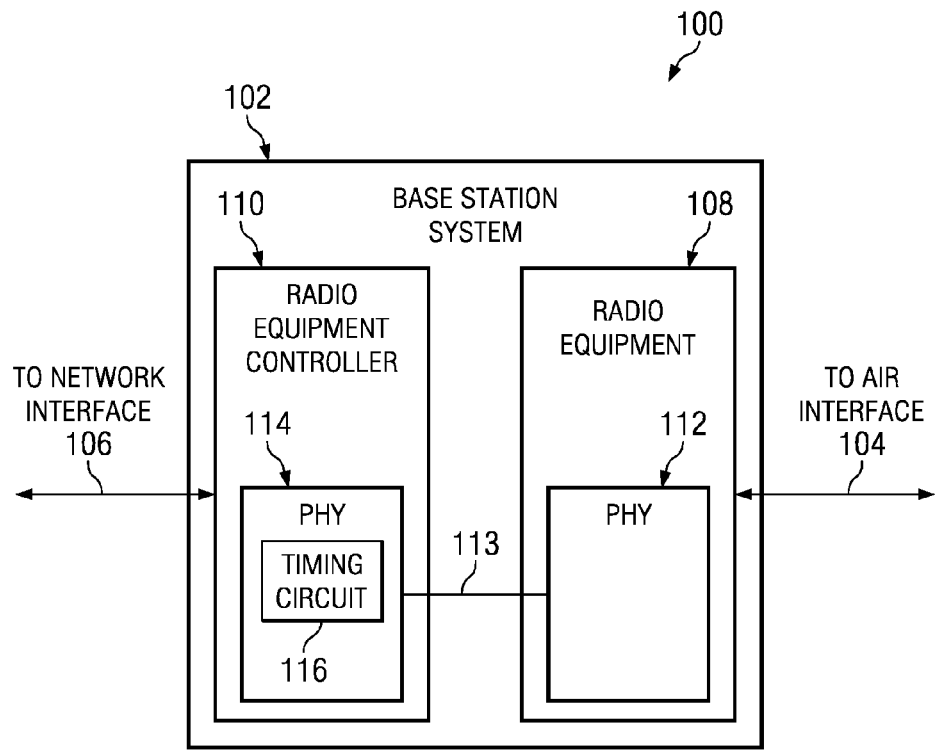
FIG. 1 is a block diagram of an example of a conventional communications system.
Figure 2:
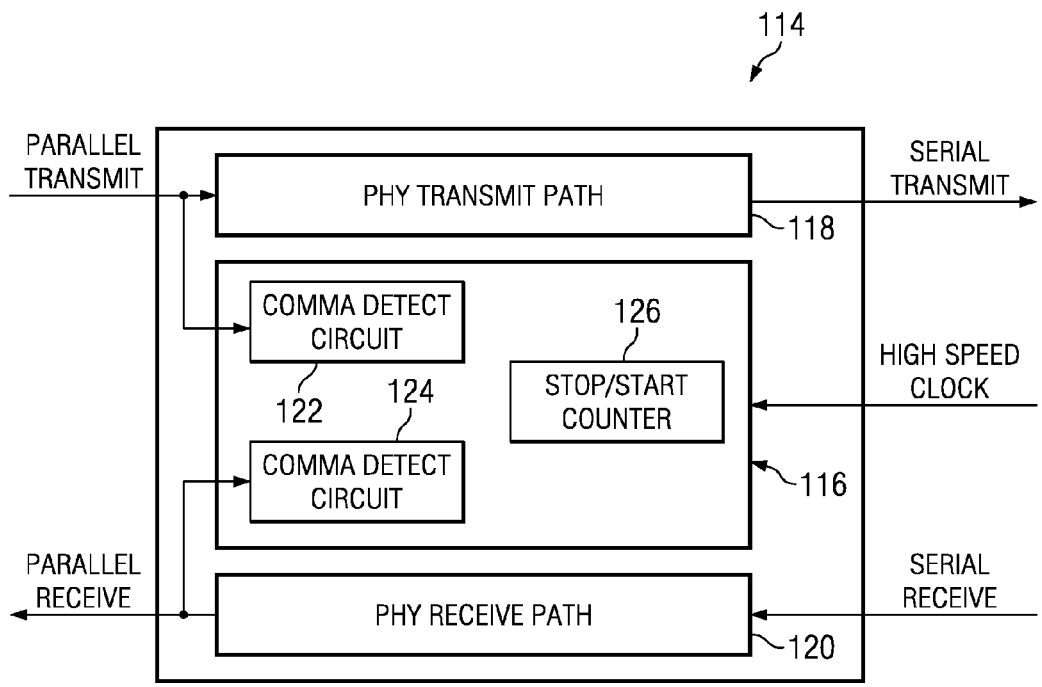
FIG. 2 is a block diagram of an example of the PHY of FIG. 1 used with a CPRI/OBSAI link.

Refer now to the drawings wherein depicted elements are, for the sake of clarity, not necessarily shown to scale and wherein like or similar elements are designated by the same reference numeral through the several views.

Figure 3:
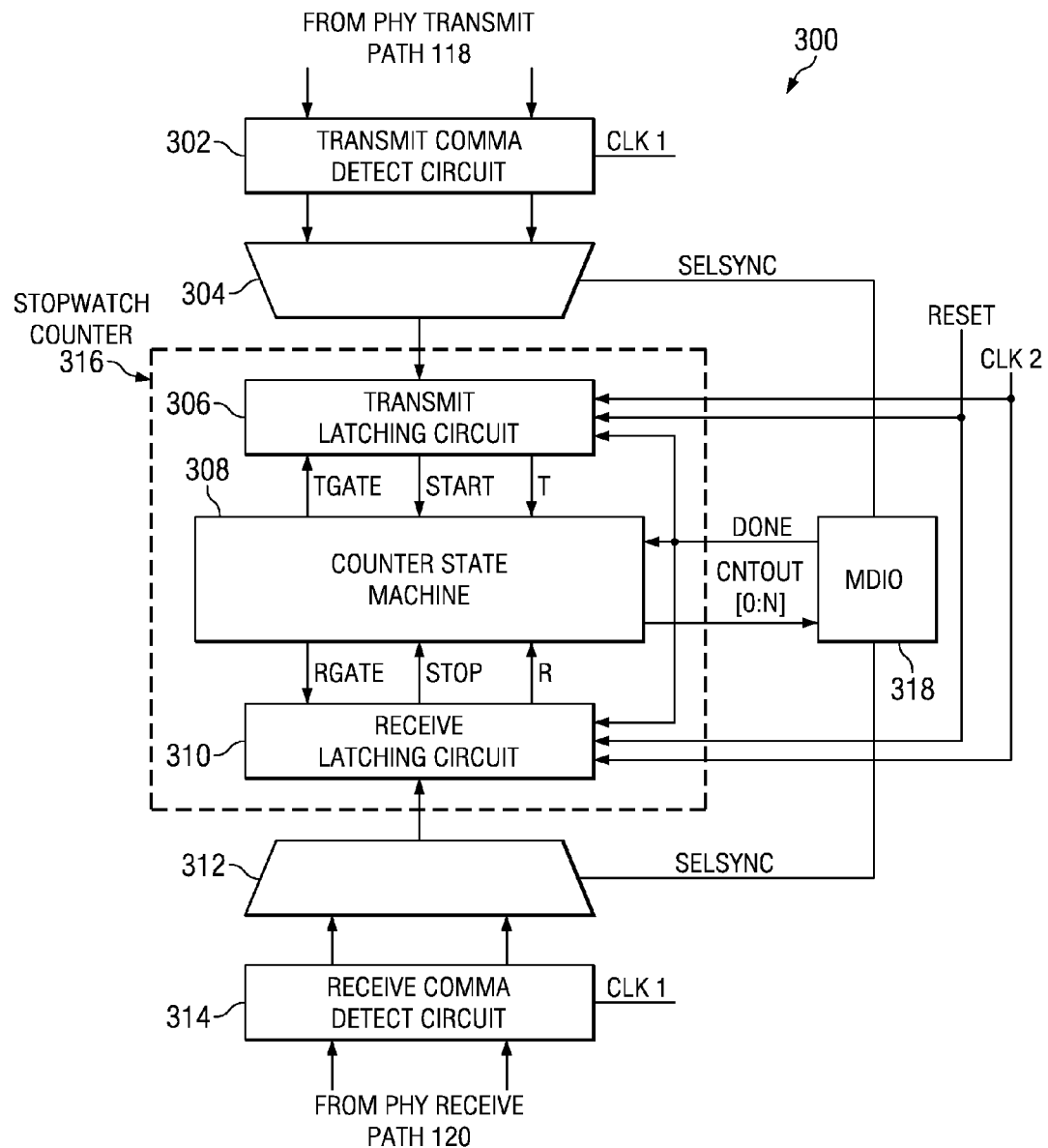
FIG. 3 is a block diagram of a timing circuit in accordance with a preferred embodiment of the present invention.

Turning to FIG. 3 of the drawings, an example of a timing circuit 300 in accordance with a preferred embodiment of the present invention can be seen. Timing circuit 300 generally comprises a transmit comma detect circuit 302, a receive comma detect circuit 314, multiplexers 304 and 312, a stopwatch counter 316, and a Management Data Input/Output circuit (MDIO) 318. The stopwatch counter 316 generally comprises a transmit latching circuit 306, a counter state machine 308, and a receive latching circuit 310.

In operation, the transmit comma detect circuit 302 performs comma detection for PHY transmit path 118, while the receive comma detect circuit 314 performs comma detection for PHY receive path 120. Each of these circuits 302 and 314 is clocked by clock signal CLK1 (which is typically has a frequency between about 61.4 MHz and about 614.4 MHz). It is possible however, for each of circuits 302 and 314 to be clocked by different clock signals (i.e., a receive clock signal and a transmit clock signal) which may or may not have the same frequencies, but for the sake of simplicity, only clock signal CLK1 is shown. Each of circuits 302 and 314 can also have multiple channels, but, for the sake of simplicity, two channels are shown. Multiplexers 304 and 312 (which can be, for example, instantiated 2-to-1 multiplexer cells and which can be controlled by select signal SELSYNC from MDIO 318) can then multiplex the channels from circuits 302 and 314 for the stopwatch counter 316. Typically, the detection of a transmit comma or a receive comma is reflected by the transmission of a single bit from the circuits 302 and 314 to the stopwatch counter 316.

Based on the comma detection from circuits 302 and 314, the stopwatch counter 316 is able to calculate the latency using "mixed" timings with the same clock signal CLK2. Generally, the transmit latching circuit 306 and the receive latching circuit 310 operate at twice the speed of the counter state machine 308 by using double edge latching. Initially, the counter state machine 308 asserts a gating signal TGATE to transmit latching circuit 306 to look for a transmit comma from the transmit comma detect circuit 302. Upon detection of a transmit comma from the transmit comma detect circuit 302 (and multiplexer 304, if applicable), the transmit latching circuit 306 asserts a start signal START to the counter state machine 308 and provides a count signal T to the counter state machine 308. Following the assertion of the start signal START, the counter state machine 308 asserts gating signal RGATE to the receive latching circuit 310 so as to eventually receive a stop signal STOP and a count signal R. Once the receive comma detect circuit 314 detects a receive comma (which is provided to the receive latching circuit 310 through multiplexer 312, if applicable), the receive latching circuit 310 asserts the stop signal STOP to the counter state machine 308. Based on the start signal START, the stop signal STOP, and the count signals T and R, the counter state machine 308 can issue a count output signal CNTOUT[0:N] (which can be about 20 bits long) to MDIO 318. Additionally, the MDIO 318 can assert a done signal DONE (which is typically active high) to the stopwatch counter 316 if the count output signal CNTOUT[0:N] is valid, and the stopwatch counter 316 can be reset through assertion of the reset signal RESET (which is typically active low).

Figure 4A:
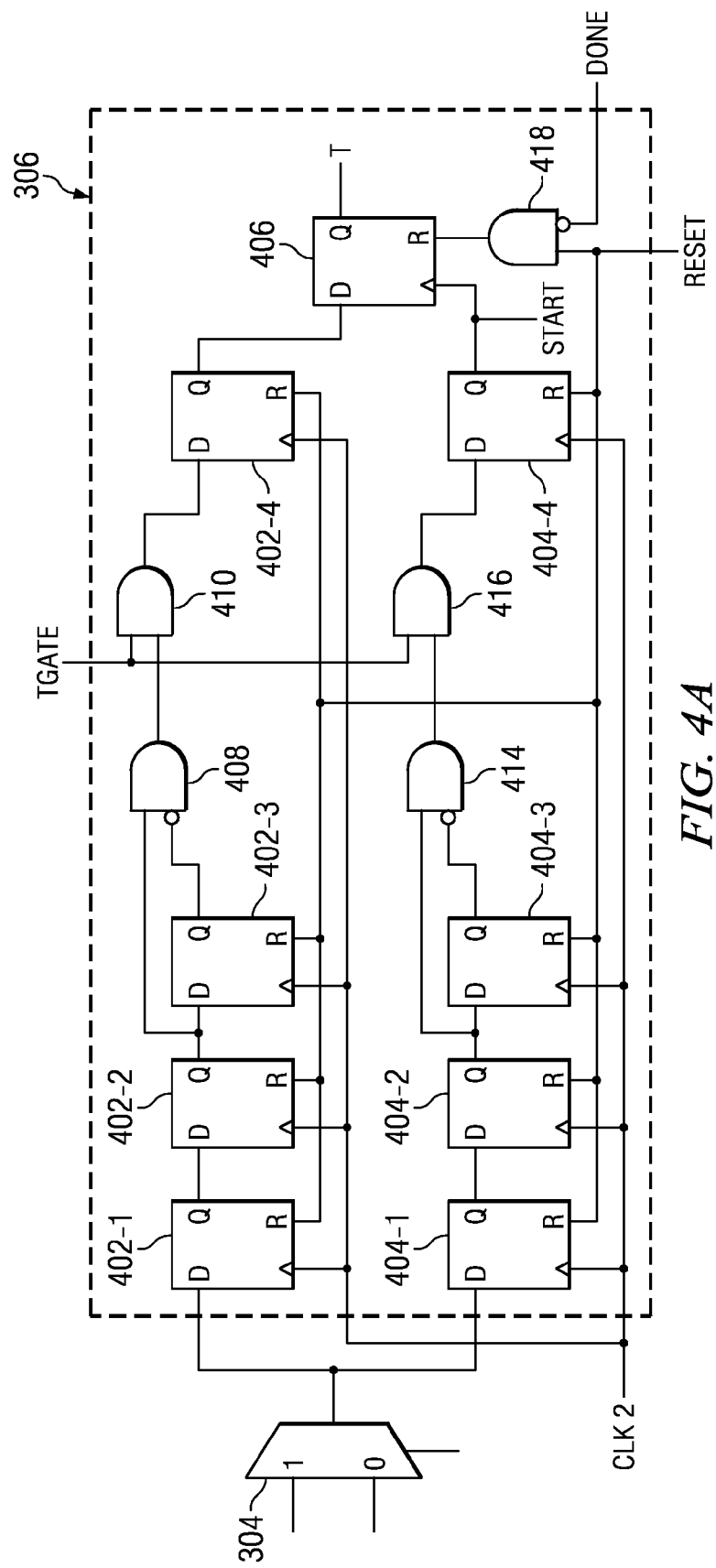
FIG. 4A is a block diagram of an example of the transmit latching circuit of FIG. 3.
Figure 4B:
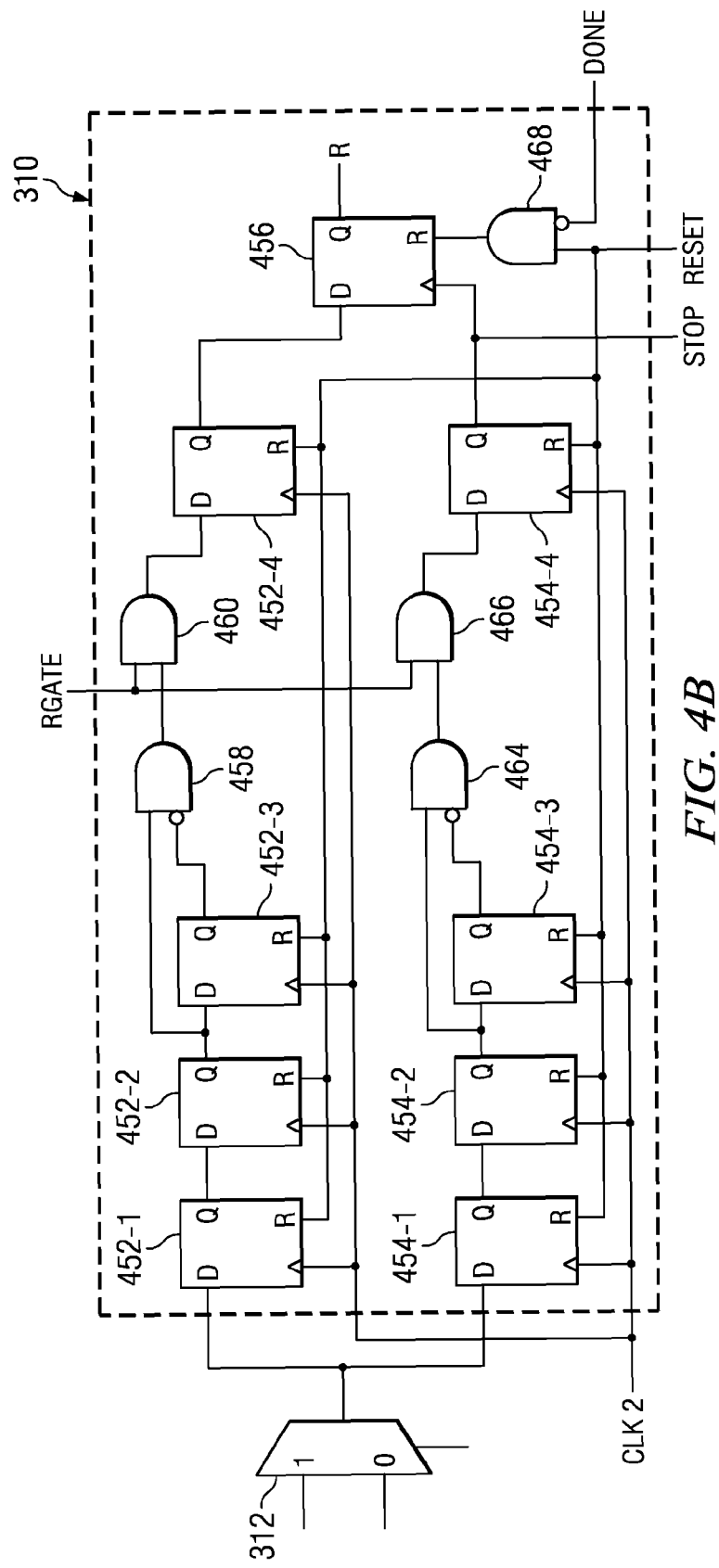
FIG. 4B is a block diagram of an example of the receive latching circuit of FIG. 3.

Turning to FIGS. 4A and 4B, examples of the transmit latching circuit 306 and receive latching circuit 310 can be seen in greater detail. Each of circuits 306 and 310 have a latching path that is clocked on the positive edge or rising edge of clock signal CLK2 (which generally has a frequency of about 1.5625 GHz) and a latching path that is clocked on the negative edge or falling edge of clock signal CLK2. The negative edge triggering paths include negative edge triggering D flip-flops 402-1 to 402-4 (for circuits 306) and 452-1 to 452-4 (for circuits 310), AND gates 408/410 (for circuits 306) and 458/460 (for circuits 310). The positive edge triggering paths include positive edge triggering D flip-flops 404-1 to 404-4 (for circuits 306) and 454-1 to 454-4 (for circuits 310), AND gates 414/416 (for circuits 306) and 464/466 (for circuits 310). The outputs from the negative edge triggering paths are then provided as the input signal for D flip-flops 406 (for circuit 306) and 456 (for circuit 310), while outputs from the positive edge triggering paths (which also operates as the start signal START and stop signal STOP) are then provided as the clock signal for D flip-flops 406 (for circuit 306) and 456 (for circuit 310).

In operation, circuits 306 and 310 are able to perform latching operations at twice the speed of clock signal CLK2 (typically about 3.125 GHz). When gated (the respective gate signal TGATE or RGATE is asserted), D flip-flops 406 (for circuit 306) and 456 (for circuit 310) register a high or low logic value from its respective negative edge triggered path based on clocking from its respective positive edge triggered path as count signals T and R. Typically, D flip-flops 406 and 456 operate at twice the speed of clock signal CLK2 in the circuits 306 and 312, and the "D" input logic for D flip-flops 406 and 456 is generally reduced to a single wire to enable fastest timing closure for a given technology. Additionally, the D flip-flops 406 (for circuit 306) and 456 (for circuit 310) can also be reset (respectively) by AND gates 418 and 468 when either the done signal DONE is asserted high or the reset signal RESET is asserted low. The other parts of the circuits 306 and 310 can also be reset by the reset signal RESET.

Figure 5:
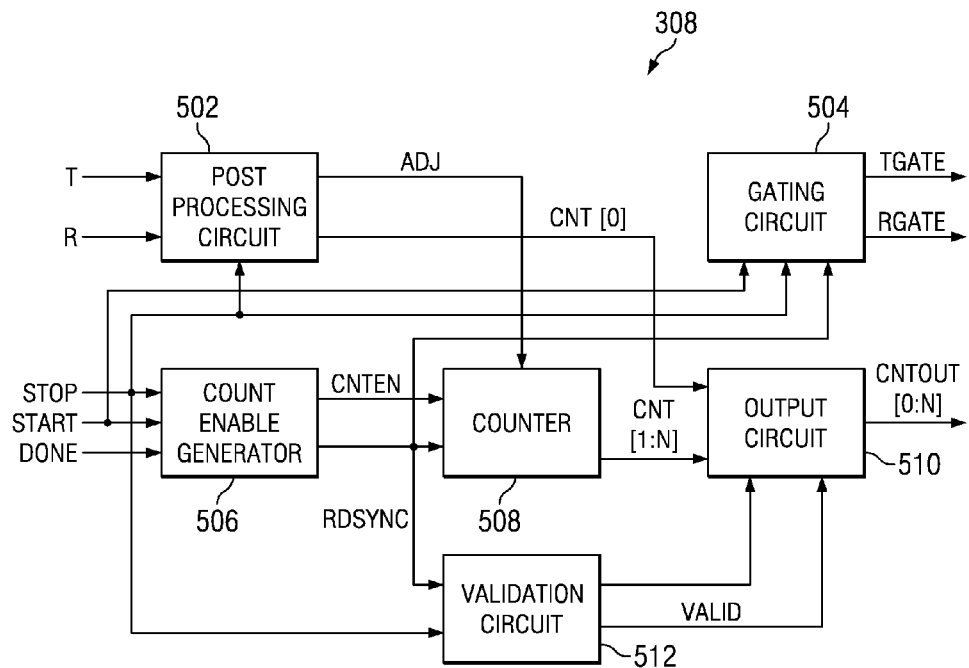
FIG. 5 is a block diagram of an example of the counter state machine of FIG. 3.

Turning now to FIG. 5, an example of the counter state machine 308 can be seen in more detail. Counter state machine 308 generally comprises post processing circuit 502, gating circuit 504, count enable generator 506, counter 508, output circuit 510, and validation circuit 512. Counter state machine 508 typically operates on the rising edge of the clock signal CLK2, but because of post processing circuit 502, the resolution of the counter state machine 308 is about twice the rate of the clock signal CLK2. Preferably, based on the logic states of count signals T and R, the counter state machine 308 operates on one of four counting modes (shown in Table 1 below) to adjust the count output signal CNTOUT[0:N].

TABLE 1

| T | 0 | 0 | 1 | 1 |
|---|---|---|---|---|
| R | 0 | 1 | 0 | 1 |
| Count Mode | +0 | −1 | +1 | +0 |

In operation, the count enable generator 506, counter 508, validation circuit 512, post processing circuit 502, and output circuit 510 operate together to generate the count output signal CNTOUT[0:N]. When the start signal START is asserted (indicating the detection of a transmit comma) and the done signal DONE is not asserted, the count enable signal generator 506 issues an enable signal CNTEN to counter 508, which begins incrementing based on the rising edge of clock signal CLK2. Typically, counter 508 is a 19-bit counter which stops when a predetermined maximum value is reached and can be reset when the done signal DONE (which is associated with the read synchronization signal RDSYNC) is asserted. Once the stop signal STOP is asserted (indicating the detection of a receive comma), the post processing circuit 502 and validation circuit 512 are enabled and the counter 508 is disabled. The validation circuit 512 issues a valid signal VALID to the output circuit 510, which enables the output circuit 510 to store count values received from the counter 508 and post processing circuit 502. The post processing circuit 502 provides the first or bit CNT[0] to the output circuit 510 and an adjustment signal ADJ to counter 508. With the adjustment from the post processing circuit 502, the counter 508 can issue a count signal CNT[1:N] (which is typically 19 bits) to the output circuit 510. Based on the $0^{th}$ bit CNT[0] and the count signal CNT[1:N], the output circuit 510 can provide the count output signal CNTOUT[0:N] to MDIO 318. Also, counter state machine 308 generally provides a feedback system for gating the transmit latching circuit 306 and the receive latching circuit 310 by employing gating circuit 504 to generate gating signals TGATE and RGATE based on the start signal START and stop signal STOP.

Figure 6:
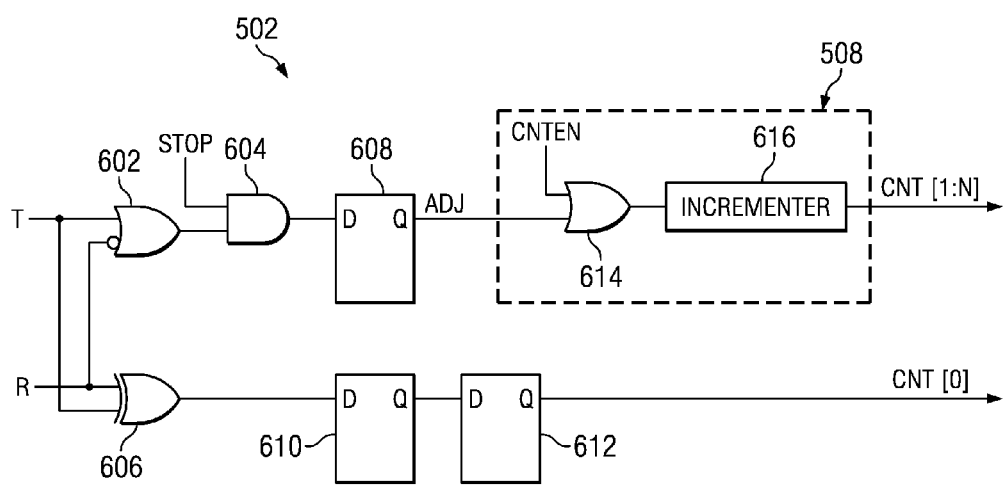
FIG. 6 is an example of the post processing circuit and counter of FIG. 5.

Turning now to FIG. 6, an example of the counter 508 and post processing circuit 502 can be seen in greater detail. The post processing circuit 502 generally comprises OR gate 602, XOR gate 606, D flip-flops 608, 610, and 612, and AND gate 604. Counter 508 generally comprises OR gate 614 and incrementer 616.

In operation, the post processing circuit 502 is able to generate the adjustment signal ADJ and the $0^{th}$ bit CNT[0] based on the count signals T and R. Because the post processing circuit 502 operates at very high speed, complex logic is not desirable, so use of subtraction (as one of the count modes shown in Table 1 above for the counter state machine 308) is not desirable. As a substitute, the counter 508 is delayed by one cycle (for example, about 0.64 ns) so that the offset allows the post processing arithmetic or count modes to be +1, +2, and +3 instead of −1, 0, and +1 (respectively), which is shown in Table 2 below.

TABLE 2

| T | 0 | 0 | 1 | 1 |
|---|---|---|---|---|
| R | 0 | 1 | 0 | 1 |
| Count Mode | +2 | +1 | +3 | +2 |

For count mode of +2, the OR gate 602 outputs a logic high signal (through AND gate 604) to D flip-flop 608, which then outputs the ADJ signal to the OR gate 614 of counter 508. As a result, incrementer 616 of counter 508 is able to increment for one additional cycle. For the count mode of +1, the XOR gate outputs a logic high signal to flip-flops 610 and 612 to reflect a "1" in the $0^{th}$ bit CNT[0]. Finally, for a count mode of +3, the incrementer 616 increments for an additional cycle and a "1" is indicated in the $0^{th}$ bit CNT[0].

As a result of using timing circuit 300, several advantages can be realized. For example, a latency measurement accuracy of 651 ps (which is 20 times better than current CPRI/OBSAI systems). Additionally, because the amount of high speed circuit has been reduced, the overall power consumption can be reduced. Also, because there can be a single bit data transfer from a low speed clock domain to a high speed clock domain, the likelihood of detecting a false comma can be greatly reduced.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   a transmit comma detect circuit that is clocked by first clock signal;
   a receive comma detect circuit that is clocked by the first clock signal; and
   a stopwatch counter having:
      a transmit latching circuit having:
         a first transmit latching path that is clocked by negative edges of a second clock signal and that is coupled to the transmit comma detect circuit, wherein the frequency of the second clock signal is greater than the frequency of the first clock signal;
         a second transmit latching path that is clocked by positive edges of the second clock signal and that is coupled to the transmit comma detect circuit; and
         a first flip-flop having an input terminal, a clock terminal, and an output terminal, wherein the input terminal of the first flip-flop is coupled to the first transmit latching path, and wherein the clock terminal of the first flip-flop is coupled to the second transmit latching path;
      a receive latching circuit having:
         a first receive latching path that is clocked by the negative edges of the second clock signal and that is coupled to the receive comma detect circuit;
         a second receive latching path that is clocked by the positive edges of the second clock signal and that is coupled to the receive comma detect circuit; and
         a second flip-flop having an input terminal, a clock terminal, and an output terminal, wherein the input terminal of the first flip-flop is coupled to the first receive latching path, and wherein the clock terminal of the first flip-flop is coupled to the second receive latching path; and
      a counter state machine that is coupled to the second transmit latching path, the second receive latching path, the first flip-flop, and the second flip-flop.

2. The apparatus of claim 1, wherein the first transmit latching path and the first receive latching path each further comprise:
   a plurality of input negative edge triggering flip-flops coupled in series with one another;
   a first logic circuit that is coupled to at least one of the input negative edge triggering flip-flops; and
   an output negative edge triggering flip-flop that is coupled to the first logic circuit and the first flip flop for the first transmit latching path and the second flip-flop for the first receive latching path.

3. The apparatus of claim 2, wherein the first logic circuit further comprises:
   a first AND gate that is coupled to at least two of the input negative edge triggering flip-flops; and
   a second AND gate that is coupled to the first AND gate and the counter state machine.

4. The apparatus of claim 2, wherein the second transmit latching path and the second receive latching path each further comprise:
   a plurality of input positive edge triggering flip-flops coupled in series with one another;
   a first logic circuit that is coupled to at least one of the input positive edge triggering flip-flops; and
   an output positive edge triggering flip-flop that is coupled to the fourth AND gate and the first flip flop for the second transmit latching path and the second flip-flop for the second receive latching path.

5. The apparatus of claim 4, wherein the first logic circuit further comprises:
   a first AND gate that is coupled to at least two of the input positive edge triggering flip-flops; and
   a second AND gate that is coupled to the first AND gate and the counter state machine.

6. The apparatus of claim 4, wherein the counter state machine further comprises:
  a count enable generator that is coupled to the output positive edge triggering flip-flop from each of the second transmit latching path and the second receive latching path;
  a post processing circuit that is coupled to the count enable generator;
  a counter that is coupled to the count enable generator;
  a validation circuit count enable generator;
  an output circuit that is coupled to the counter and the validation circuit; and
  a gating circuit that is coupled to the output positive edge triggering flip-flop from each of the second transmit latching path and the second receive latching path and the count enable generator.

7. The apparatus of claim 6, wherein the post processing circuit and counter further comprises:
  a first OR gate that is coupled to the first flip-flop and the second flip-flop;
  an XOR gate that is coupled to the first flip-flop and the second flip-flop;
  an AND gate that is coupled to the first OR gate and the count enable generator;
  a third flip-flop that is coupled to the AND gate;
  a second OR gate that is coupled to the count enable generator and the third flip-flop;
  an incrementer that is coupled to the second OR gate and the count enable generator;
  a fourth flip-flop that is couple to the XOR gate; and
  a fifth flip-flop that is coupled to the fourth flip-flop and the count enable generator.

8. The apparatus of claim 7, wherein the transmit comma detect circuit and the receive comma detect circuit each have a plurality of channels, and wherein the first clock signal further comprises a transmit clock signal for clocking the transmit comma detect circuit and a receive clock signal for clocking the receive comma detect circuit, and wherein the apparatus further comprises:
  a first multiplexer that is coupled between the transmit comma detect circuit and the stopwatch counter; and
  a second multiplexer that is coupled between the receive detect circuit and the stopwatch circuit.

9. An apparatus comprising:
  a physical layer (PHY) transmit path;
  a PHY receive path;
  a transmit comma detect circuit that is clocked by first clock signal and that is coupled to the PHY transmit path;
  a receive comma detect circuit that is clocked by the first clock signal and that is coupled to the PHY receive path; and
  a stopwatch counter having:
    a transmit latching circuit having:
      a first transmit latching path that is clocked by negative edges of a second clock signal and that is coupled to the transmit comma detect circuit, wherein the frequency of the second clock signal is greater than the frequency of the first clock signal;
      a second transmit latching path that is clock by positive edges of the second clock signal and that is coupled to the transmit comma detect circuit; and
      a first flip-flop having an input terminal, a clock terminal, and an output terminal, wherein the input terminal of the first flip-flop is coupled to the first transmit latching path, and wherein the clock terminal of the first flip-flop is coupled to the second transmit latching path;
    a receive latching circuit having:
      a first receive latching path that is clocked by the negative edges of the second clock signal and that is coupled to the receive comma detect circuit;
      a second receive latching path that is clocked by the positive edges of the second clock signal and that is coupled to the receive comma detect circuit; and
      a second flip-flop having an input terminal, a clock terminal, and an output terminal, wherein the input terminal of the second flip-flop is coupled to the first receive latching path, and wherein the clock terminal of the first flip-flop is coupled to the second receive latching path; and
    a counter state machine that is coupled to the second transmit latching path, the second receive latching path, the first flip-flop, and the second flip-flop.

10. The apparatus of claim 9, wherein the first transmit latching path and the first receive latching path each further comprise:
  a plurality of input negative edge triggering flip-flops coupled in series with one another;
  a first logic circuit that is coupled to at least one of the input negative edge triggering flip-flops; and
  an output negative edge triggering flip-flop that is coupled to the first logic circuit and the first flip flop for the first transmit latching path and the second flip-flop for the first receive latching path.

11. The apparatus of claim 10, wherein the first logic circuit further comprises:
  a first AND gate that is coupled to at least two of the input negative edge triggering flip-flops; and
  a second AND gate that is coupled to the first AND gate and the counter state machine.

12. The apparatus of claim 10, wherein the second transmit latching path and the second receive latching path each further comprise:
  a plurality of input positive edge triggering flip-flops coupled in series with one another;
  a first logic circuit that is coupled to at least one of the input positive edge triggering flip-flops; and
  an output positive edge triggering flip-flop that is coupled to the fourth AND gate and the first flip flop for the second transmit latching path and the second flip-flop for the second receive latching path.

13. The apparatus of claim 12, wherein the first logic circuit further comprises:
  a third AND gate that is coupled to at least two of the input positive edge triggering flip-flops; and
  a fourth AND gate that is coupled to the third AND gate and the counter state machine.

14. The apparatus of claim 12, wherein the counter state machine further comprises:
  a count enable generator that is coupled to the output positive edge triggering flip-flop from each of the second transmit latching path and the second receive latching path;
  a post processing circuit that is coupled to the count enable generator;
  a counter that is coupled to the count enable generator;
  a validation circuit count enable generator;
  an output circuit that is coupled to the counter and the validation circuit; and a gating circuit that is coupled to the output positive edge triggering flip-flop from each of the second transmit latching path and the second receive latching path and the count enable generator.

15. The apparatus of claim 14, wherein the post processing circuit and counter further comprises:
   a first OR gate that is coupled to the first flip-flop and the second flip-flop;
   an XOR gate that is coupled to the first flip-flop and the second flip-flop;
   an AND gate that is coupled to the first OR gate and the count enable generator;
   a third flip-flop that is coupled to the AND gate;
   a second OR gate that is coupled to the count enable generator and the third flip-flop;
   an incrementer that is coupled to the second OR gate and the count enable generator;
   a fourth flip-flop that is couple to the XOR gate; and
   a fifth flip-flop that is coupled to the fourth flip-flop and the count enable generator.

16. The apparatus of claim 15, wherein the transmit comma detect circuit and the receive comma detect circuit each have a plurality of channels, and wherein the first clock signal further comprises a transmit clock signal for clocking the transmit comma detect circuit and a receive clock signal for clocking the receive comma detect circuit, and wherein the apparatus further comprises:
   a first multiplexer that is coupled between the transmit comma detect circuit and the stopwatch counter; and
   a second multiplexer that is coupled between the receive detect circuit and the stopwatch circuit.

17. A method for measuring latency in a Common Public Radio Interface/Open Base Station Architecture Initiative (CPRI/OBSAI) system, the method comprising:
   performing transmit comma detection so as to generate a transmit comma detection scalar;
   generating a start signal from the transmit detection scalar based on positive edge triggering of a clock signal;
   generating a first data signal from the transmit detection scalar based on negative edge triggering of the clock signal;
   latching the first data signal so as to generate a transmit signal, wherein the start signal is used as a transmit clocking signal for the step of latching the first data signal;
   performing receive comma detection so as to generate a receive comma detection scalar;
   generating a stop signal from the receive detection scalar based on positive edge triggering of the clock signal;
   generating a second data signal from the receive detection scalar based on negative edge triggering of the clock signal;
   latching the second data signal so as to generate a receive signal, wherein the stop signal is used as a receive clocking signal for the step of latching the second data signal; and
   calculating the latency based at least in part on receive signal, transmit signal, stop signal, and start signal.

18. The method of claim 17, wherein the method step of calculating further comprises:
   counting between assertion of the start signal and assertion of the stop signal; and
   performing a correction calculation after assertion of the stop signal.

19. The method of claim 18, wherein the step of performing a correction calculation further comprises:
   XORing the transmit and receive signals;
   latching the XORed the transmit and receive signals to generate a first latched signal;
   ORing the transmit signal and an inverse of the receive signal;
   latching the ORed transmit signal and inverse of the receive signal to generate a second latched signal;
   ORing with second latched signal and an enable signal to generate an increment signal; and
   incrementing based at least in part on the increment signal.

* * * * *